United States Patent
Tummala et al.

(10) Patent No.: US 9,830,105 B1
(45) Date of Patent: Nov. 28, 2017

(54) MIGRATING DATA OBJECTS TOGETHER WITH THEIR SNAPS

(71) Applicant: EMC Corporation, Hopkinton, MA (US)

(72) Inventors: Himabindu Tummala, South Grafton, MA (US); Jean-Pierre Bono, Westborough, MA (US); Santosh PasulaReddy, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 14/976,980

(22) Filed: Dec. 21, 2015

(51) Int. Cl.
G06F 12/00 (2006.01)
G06F 3/06 (2006.01)
G06F 12/0802 (2016.01)

(52) U.S. Cl.
CPC ............ *G06F 3/0647* (2013.01); *G06F 3/061* (2013.01); *G06F 3/065* (2013.01); *G06F 3/0632* (2013.01); *G06F 3/0683* (2013.01); *G06F 12/0802* (2013.01); *G06F 2212/60* (2013.01)

(58) Field of Classification Search
CPC ...... G06F 12/00; G06F 12/08; G06F 12/0811; G06F 12/0897; G06F 11/1446
USPC .......................... 711/100, 118, 154, 162, 170
See application file for complete search history.

(56) References Cited

U.S. PATENT DOCUMENTS

| | | | |
|---|---|---|---|
| 7,631,155 B1 | 12/2009 | Bono et al. | |
| 7,769,722 B1 | 8/2010 | Bergant et al. | |
| 8,706,833 B1 | 4/2014 | Bergant et al. | |
| 9,286,007 B1 | 3/2016 | Bono | |
| 2002/0133512 A1* | 9/2002 | Milillo | G06F 11/2082 |
| 2005/0268054 A1* | 12/2005 | Werner | G06F 11/2069 711/162 |
| 2005/0278391 A1* | 12/2005 | Spear | G06F 11/2069 |
| 2007/0185973 A1 | 8/2007 | Wayda et al. | |
| 2008/0086608 A1* | 4/2008 | Kano | G06F 3/0607 711/162 |
| 2011/0225359 A1* | 9/2011 | Kulkarni | G06F 3/0607 711/114 |

OTHER PUBLICATIONS

"EMC Celerra Replicator—Advanced IP Storage Protection", (PowerPoint Presentation), EMC Corporation, EMC Corporation, Hopkinton, MA, 2008, 27 pages.
"EMC RecoverPoint Family", (Data Sheet H2769), EMC Corporation, EMC Corporation, Hopkinton, MA, Aug. 2013, 6 pages.
"EMC VNX Snapshots", (White Paper), EMC Corporation, EMC Corporation, Hopkinton, MA, Dec. 2013, 57 pages.

* cited by examiner

Primary Examiner — Tuan Thai
(74) Attorney, Agent, or Firm — BainwoodHuang (57) ABSTRACT

A technique for performing non-disruptive migration coordinates object migration with snapshot-shipping to migrate both a data object and its snaps from a source to a target. Snapshot-shipping conveys snaps to the target, and an internal snap of the data object serves as a basis for building a migrated version of the data object at the target. As IO requests specifying writes to the data object arrive at the source, a data mirroring operation writes the arriving data both to the data object at the source and to the version thereof at the target. In parallel with the data mirroring operation, a filtering copy operation copies data of the internal snap to the target, but avoids overwriting data mirrored to the target after the internal snap is taken.

18 Claims, 5 Drawing Sheets

MIGRATING DATA OBJECTS TOGETHER WITH THEIR SNAPS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems often use non-disruptive migration to move data objects hosted from one set of storage elements to another without removing the data objects from service. For example, an administrator may wish to migrate an actively accessed LUN (Logical Unit Number, referring to a logical disk) from an older or slower set of disk drives to a newer or faster set of disk drives. Migration may also be used for load balancing and/or for deploying new features incompatible with existing settings, such as deduplication, for example.

One prior technique for performing non-disruptive migration of a source LUN to a target LUN performs a background copy in parallel with servicing IO (Input/Output) requests directed to the source LUN. The background copy proceeds in an ordered fashion through the source LUN, e.g., starting from a beginning offset of the source LUN and proceeding to an ending offset. A marker indicates a current offset to which the background copy has progressed. If an IO request arrives specifying data to be written to a location in the source LUN that is greater than the current marker location, the specified data is written only to the source LUN. However, if an IO request specifies data to be written to a location less than the current marker location, the specified data is written to both the source LUN and the target LUN. In this manner, the source LUN and the target LUN become synchronized. Once copying is complete, the source LUN may be taken offline, with service proceeding henceforth from the target LUN.

SUMMARY

Unfortunately, the above-described approach for performing non-disruptive migration of data objects does nothing to preserve snapshots of those data objects. As is known, snapshots (or, simply, "snaps") are point-in-time versions of a data object. Using snaps, a data storage system administrator can roll back a data object to previous points in time, i.e., those captured in the snaps, for restoring from previous versions or for retrieving data that has since been deleted from the data object. Thus, for example, while the prior scheme can migrate a source object to a target object, it does not promote migration of snaps of the source object and the history of the source object may be lost once migration is complete. As a result, there may be no ability to roll back to a point in time prior to the migration or to retrieve data from any such earlier point in time.

In contrast with the prior approach, an improved technique for performing non-disruptive migration coordinates data migration with snapshot-shipping to preserve both a data object and its snaps at the target. Snapshot-shipping conveys snaps of the data object from source to target, and an internal snap of the data object serves as a basis for constituting the data object itself at the target. As IO requests specifying writes to the data object arrive at the source, a data mirroring operation writes the data both to the data object at the source and to a version thereof at the target. In parallel with the data mirroring operation, a filtering copy operation copies data of the internal snap to the version at the target, but avoids overwriting data mirrored to the target after the internal snap was taken. Advantageously, the improved technique preserves snaps at the target, thus enabling and administrator to roll back the data object at the target to points in time prior to migration and/or to restore data from such earlier points in time. The improved technique also preserves transparency in migration and makes efficient use of snap technology in migrating the data object itself.

Certain embodiments are directed to a method of performing data migration. The method includes duplicating multiple source snaps to generate multiple respective target snaps, each of the source snaps being a point-in-time version of a source data object, and generating an internal snap of the source data object, the internal snap being a point-in-time version of the source data object. The method further includes performing a data mirroring operation, the data mirroring operation including (i) receiving, over time, multiple IO (Input/Output) requests specifying respective data to be written to the source data object, (ii) writing the data specified in the IO requests both to the source data object and to a target data object, the target data object providing a migrated version of the source data object, and (iii) marking a bitmap to indicate locations within the source data object at which the data specified in the IO requests are written. While performing the data mirroring operation, the method still further includes simultaneously performing a filtering copy operation, the filtering copy operation including (i) in response to the bitmap not being marked for a first location within the source data object, copying a set of data at a corresponding first location of the internal snap to the target data object, and (ii) in response to the bitmap being marked for a second location within the source data object, performing no copying of data at a corresponding second location of the internal snap to the target data object.

Other embodiments are directed to a data storage system constructed and arranged to perform a method of performing data migration, such as the method described above. Still other embodiments are directed to a computer program product. The computer program product stores instructions which, when executed on control circuitry of a data storage system, cause the data storage system to perform a data migration method, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein. It is not intended to set forth requirements of the invention hereof nor is it intended to be in limiting in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for performing non-disruptive migration coordinates data migration with snapshot-shipping to preserve both a data object and its snaps at the target. Advantageously, administrators are thus able to roll back the data object at the target to points in time prior to the migration and/or restore data at the target from such earlier points in time.

Figure 1:
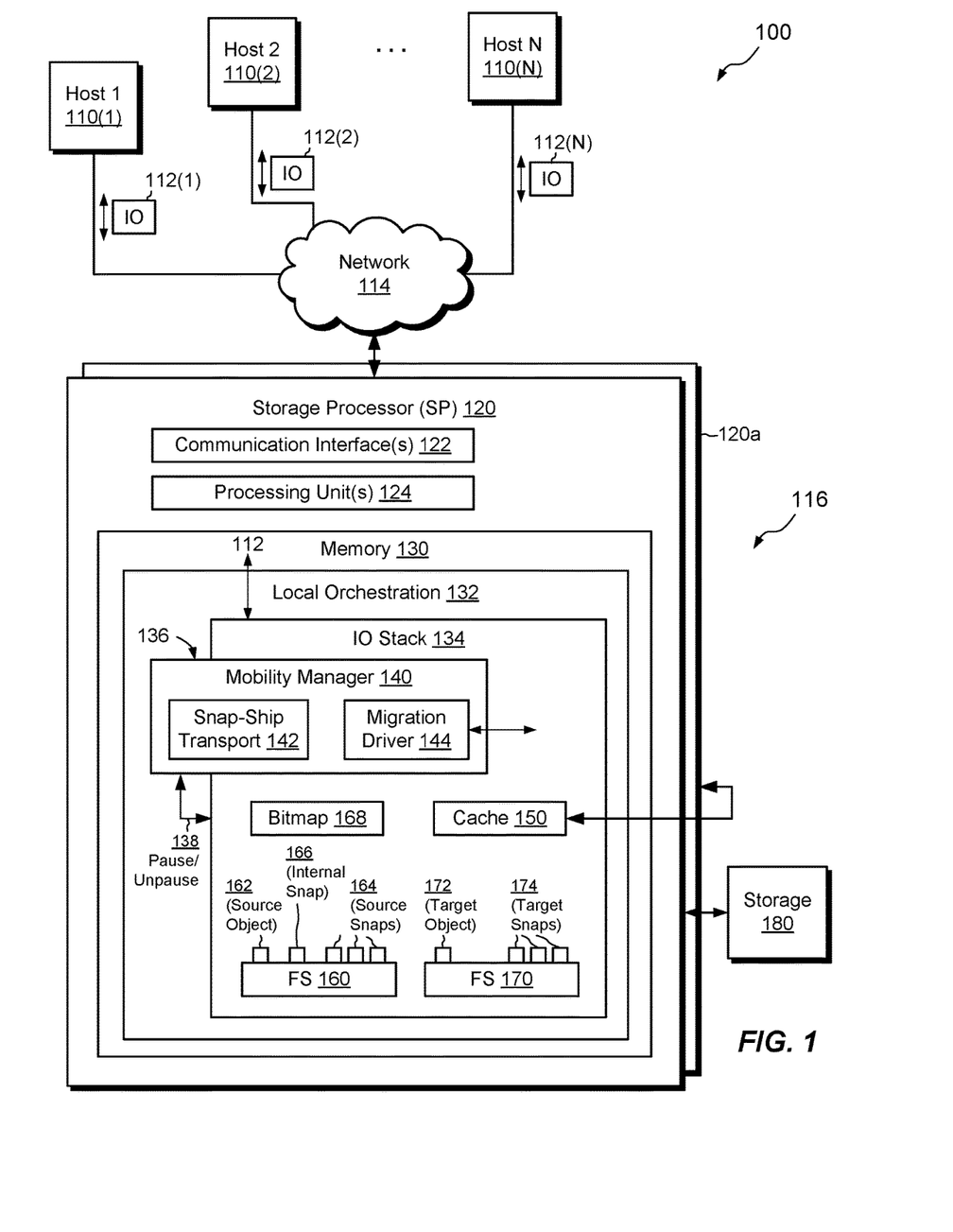
FIG. 1 is a block diagram showing an example environment in which embodiments of the improved technique hereof can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180, such as magnetic disk drives, electronic flash drives, and the like. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes, i.e., implements with executable instructions, local orchestration 132 and an IO stack 134. The local orchestration 132 controls data storage activities running on SP 120. The IO stack 134 runs within the context of local orchestration 132 and provides an execution path for host IOs, i.e., for IO requests 112(1-N). A mobility manager 140 runs within both the local orchestration 132 and the IO stack 134 and includes, for example, a snapshot-shipping transport 142 and a migration driver 144. The mobility manager 140 may include other transports and/or drivers besides those shown, and may be able to switch between such transports and/or drivers to orchestrate activities that involve different types of data movement. In some examples, the mobility manager 140 can selectively insert such transports and/or drivers into processing in the IO stack 134 to affect the processing of IO requests 112(1-N).

The IO stack 134 is seen to include a cache 150 and file systems 160 and 170. In some examples, a separate cache 150 is provided on each of the SPs 120 and 120a, with the caches configured as mirrors, such that writes the cache on either of the SPs are reflected in the cache of the other SP.

In the example shown, the file system 160 includes a file 162, which provides a complete realization of a source data object, such as a LUN (Logical Unit Number, referring to a logical storage unit), a host file system, or a VVol (virtual machine volume), for example. Using mapping, the IO stack 134 expresses the file 162 to hosts 110 in its proper form, e.g., as a LUN, file system, or VVol.

The file system 160 is further seen to include files 164, which provide snaps of the file 162 and thus snaps of the source data object. The different snaps 164 may have been taken at different points in time. In an example, the snaps 164 are so-called "redirect-on-write" snaps or write anywhere logic. When each of the snaps 164 is taken, a small amount of metadata of the file 162 is copied to create the snap, but the snap initially shares the same underlying storage (e.g., the same data blocks) with the file 162. Over time, the file 162 may evolve to reflect changes in the source data object. Changes in contents of file 162 that are shared with one or more of the snaps 164 may result in write splits, with newly written data stored in newly allocated blocks and metadata of the file 162 updated to point to the new block locations. Metadata of the snaps continue to point to the same block locations as before. In this manner, each snap 164 is simply a version of the data object in file 162 frozen in time. Although realizing data objects and their snaps in the form of files and providing snaps as redirect-on-write snaps is one example, this example should not be construed as limiting, as data objects and their snaps may be realized in other forms besides as files and the snaps may be taken by other means. The example provided herein is intended merely to be illustrative.

It should be understood that the terms "source" and "target" as used herein refer to respective roles in migration, with the "source" being a set of objects to be migrated and the "target" being the migrated objects. The terms are not intended to indicate physical locations, however. Thus, a source and a target may share the same physical location or may occupy different physical locations.

In example operation, the hosts 110(1-N) issue IO requests 112 (i.e., any of 112(1-N)) to the source data object stored in the data storage system 116. The SP 120 receives the IO requests 112 at the communication interfaces 122 and initiates further processing. Such further processing may involve directing the IO requests 112 to the IO stack 134, which translates reads and writes specified in the IO requests 112 to corresponding reads and writes of the file 162 in the file system 160.

In the course of serving the source data object from file 162 to hosts 110, the mobility manager 140 may receive a migration request 136. For example, an administrator of the data storage system 116 issues the request 136 from an administrative console (not shown). The request 136 specifies migration of the source data object and its snaps to a target location. The target location may be specified as a file system, a storage pool, an SP, and/or a data storage system, for example, and may thus be either local or remote. In the particular example shown, the request 136 specifies the target location as the file system 170.

In response to the request 136, the mobility manager 140 communicates with local orchestration 132 to create a file 172 in the file system 170, for providing a migrated version of the source data object realized in the file 162. Migration of the source data object and its snaps involves coordinating activities between the snapshot-shipping transport 142 and the migration driver 144 and may proceed in one of two ways, for example.

According to a first approach, the mobility manager 140 directs the snapshot-shipping transport 142 to migrate source snaps 164 to the target, i.e., to create target snaps 174 in the file system 170. Once the snaps 164 are migrated to the target, the mobility manager 140 then directs the migration driver 144 to migrate the source object in file 162 to the target, e.g., to file 172.

According to a second approach, the mobility manager 140 first directs migration of the source object in file 162 to the target object in file 172. The mobility manager 140 then directs migration of the source snaps 164 to the target, but only after the target object 172 has been brought online.

The first approach makes efficient use of storage resources but can consume significant time before the target object in file 172 becomes available to hosts 110. This efficient approach may thus be preferred in circumstances when there is no urgent need to bring the target online quickly. The second approach brings the target object in file 172 online more quickly but can involve more copying and thus makes less efficient use of storage resources. This fast approach may thus be preferred when migration is urgent, such as when the file 162 is being heavily accessed and must be moved quickly to faster storage (e.g., to flash) if the data object stored therein is to continue meeting service level agreements. In an example, the migration request 136 specifies which of the above-described options is to be applied, e.g., based on administrator preference.

It should be appreciated that migration of the source data object in the file 162 involves more than simple copying of file data, as the file 162 is dynamic and changes in response to arrival of new IO requests 112 as copying proceeds. In an example, migration of the source data object in file 162 is conducted non-disruptively as follows.

Migration of the data object in file 162 may begin with the mobility manager 140 asserting command 138 to pause the IO stack 134. In response to command 138, the IO stack 134 temporarily suspends processing of IO requests 112. With the IO stack 132 paused, the mobility manager 140 directs an internal snap 166 to be taken of the file 162. The internal snap 166 is a point-in-time version of the file 162 (e.g., a redirect-on-write snap) and is separate from any user-generated snap taken for data protection purposes. While the IO stack 134 is paused, the mobility manager 140 directs creation of a bitmap 168. In an example, the bitmap 168 includes one bit for each addressable storage location in the internal snap 166. The bitmap 168 is initialized to a fully cleared state, such that none of its bits are set. With the IO stack 134 still paused, the mobility manager 140 inserts the migration driver 144 into the IO stack 134 to enable synchronous mirroring of IO requests 112 to both the source data object in file 162 and the target data object in file 172. These acts of taking the internal snap 166, initializing the bitmap 168, and inserting the migration driver 144 into the IO stack 134 may be performed in any order. Next, the migration driver 140 de-asserts command 138 to unpause the IO stack 134. IO requests 112, which may have been queued, are then allowed to propagate down the IO stack 134 in the order received.

For each IO request 112 that specifies data to be written to a designated location in the file 162, the migration driver 144 marks (e.g., sets to "1") a corresponding location in the bitmap 168 and performs a data mirroring operation to write the specified data to the designated location both in the file 162 and in the file 172. In parallel with performing this data mirroring operation, the migration driver 144 performs a filtering copy operation. The filtering copy operation copies data from the internal snap 166 to the target file 172, but only for locations that are not marked in the bitmap 168. In this manner, copying of data from the internal snap 166 to the file 172 excludes locations that have been written in the files 162 and 172 in response to IO requests 112 since the time the internal snap 166 was taken. Thus, the filtering copying operation avoids overwriting more recent data in the files 162 and 172 with older data.

It should be appreciated that the filtering copy operation can extend over a considerable period of time depending on the amount of data to be copied. Thus, the internal snap 166 may fall considerably behind the file 162 as new IO requests 112 arrive. Nevertheless, the data mirroring and filtering copy operations ensure that both the file 162 and the file 172 are current and equivalent by time the filtering copy operation completes. Once the filtering copy operation is complete, the mobility manager 140 may remove the migration driver 144 from the IO stack 134, briefly pausing the IO stack 134 if necessary, and permanently redirect IO requests 112 to the target object hosted from the file 172.

Upon completion of migration of both the source data object and its snaps, the source object (file 162) and its snaps (files 164) are brought offline. These objects may be destroyed, with their supporting storage recycled for other purposes. Hosts 110 can continue to access the data object (e.g., the LUN, file system, VVol, etc.) previously hosted from the file 162 from the target object in file 172. If it is ever desired to roll back the data object to a point in time prior to the migration, an administrator can restore earlier versions of the data object from the target snaps realized in files 174. Likewise, the administrator can access the target snaps in files 174 to retrieve data that was deleted prior to migration but is still preserved in one of more of the target snaps. Of course, new snaps may also be taken of the file 172 at the target as the data object continues to evolve.

Figure 2:
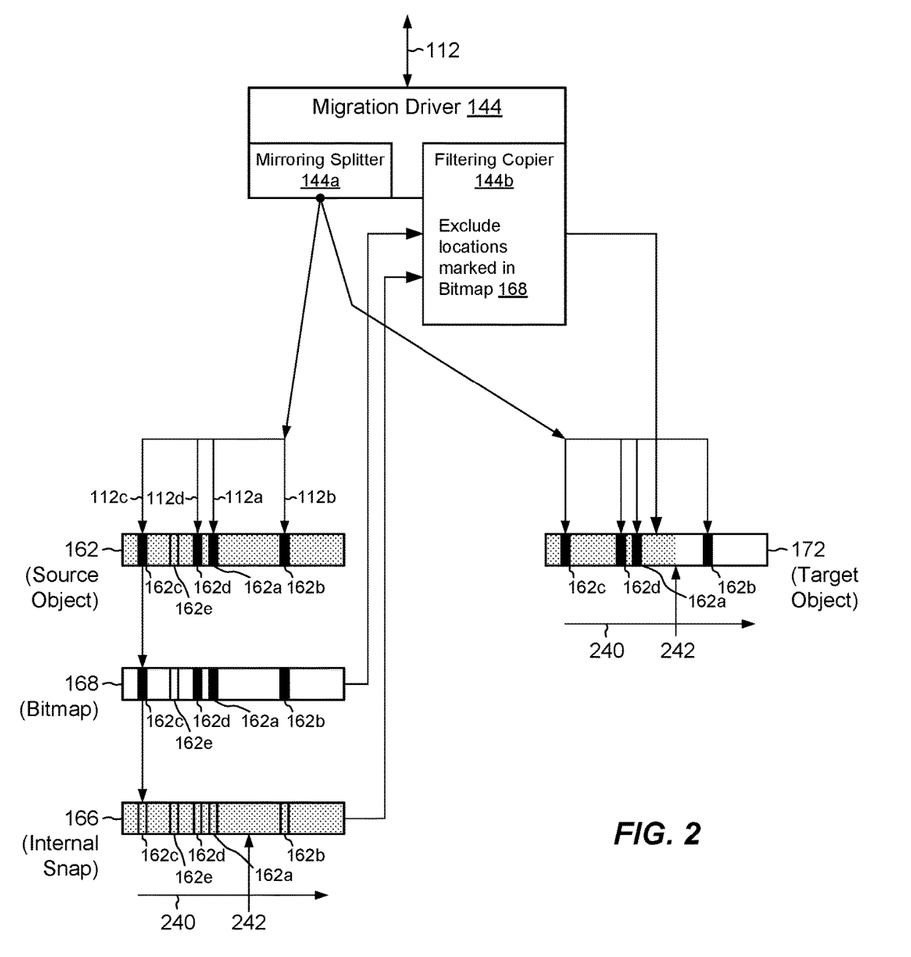
FIG. 2 is a block diagram showing example operations for migrating a source data object to a target data object.

FIG. 2 shows an example arrangement for operating the migration driver 144 in additional detail. Here, the migration driver 144 is seen to include a mirroring splitter 144a and a filtering copier 144b. The mirroring splitter 144a is configured to perform a data mirroring operation, and the filtering copier 144b is configured to perform a filtering copy operation. The migration driver 144 is configured to operate the mirroring splitter 144a and the filtering copier 144b in parallel, such that the data mirroring operation and the filtering copy operation overlap time.

In example operation, IO requests 112 arrive over time, with each IO request specifying respective data to be written to a designated location within the data object. In response to each IO request, the mirroring splitter 144a mirrors the data specified in that IO request both to the source object (file 162) and to the target object (file 172) at the location designated by that IO request.

In the example shown in FIG. 2, four IO requests are seen to have arrived. These include:
- a first IO request specifying data 112a to be written to location 162a of file 162;
- a second IO request specifying data 112b to be written to location 162b of file 162;
- a third IO request specifying data 112c to be written to location 162c of file 162; and
- a fourth IO request specifying data 112d to be written to location 162d of file 162.

In response to the first IO request, the mirroring splitter 144a effects writing of the data 112a to location 162a of both the file 162 and the file 172. Thus, the same data 112a are written to corresponding locations in both files 162 and 172. As the data are written, the mirroring splitter 144a marks the bitmap 168 at location 162a, i.e., at the location in the bitmap 168 that corresponds to the location being written in the file 162. Marking the bitmap 168 may entail setting a bit to "1," although marking may be conducted in any suitable way. Similar activities are performed for the second, third, and fourth IO requests, to store respective data 112b, 112c, and 112d at respective locations 162b, 162c, and 162d of the file 162 and of the file 172, and to mark the bitmap 168 at the same locations.

It should be appreciated that the first through fourth IO requests arrive at different times, such that the mirroring activities described above for the different IO requests extend over a period time. However, the filtering copy operation may commence any time after the internal snap 166 has been created, and may typically be started as soon as the IO stack 134 has been unpaused.

In an example, the filtering copy operation proceeds through data of the internal snap 166 in an ordered fashion, such as by starting at a beginning location an proceeding in order to an ending location. As shown in FIG. 2, the filtering copy operation may proceed in the direction of arrow 240 and may have a current location shown by arrow 242. At each location of the internal snap 166, the filtering copier 144b checks the bitmap 168 at the same location. If the bitmap 168 is unmarked at that location, then the filtering copier 144b copies the data at that location to the same location in the target object (file 172). If the bitmap 168 is marked at that location, however, no copying is performed for that location, as the target object in file 172 already has more recent data at that location than what is contained in the internal snap 166.

For example, if the current location 242 points to location 162c, then the filtering copier 144b performs no copying, as the bitmap 168 is marked at location 162c. However, if the current location 242 points to location 162e, then the filtering copier 144b does perform copying, as the bitmap 168 is unmarked at location 162e.

The filtering copier 144b proceeds in this manner, progressing from location to location through the internal snap 166, checking whether the bitmap 168 is marked for the respective location, and copying the data at the respective location to the same location in the target object only if the bitmap 168 at that location is unmarked. Eventually, the filtering copier 144b reaches the end of the internal snap 166 and copying is complete. At this point, the target object in file 172 is identical to the source object in file 162 and the migration can be committed.

Once migration is committed, the IO stack 134 directs IO requests 112 destined for the data object to the target in file 172 instead of to the source in file 162. File 172 becomes the new source for the data object, and the file 162 may be deleted or dispensed with in any desired manner.

Figure 3:
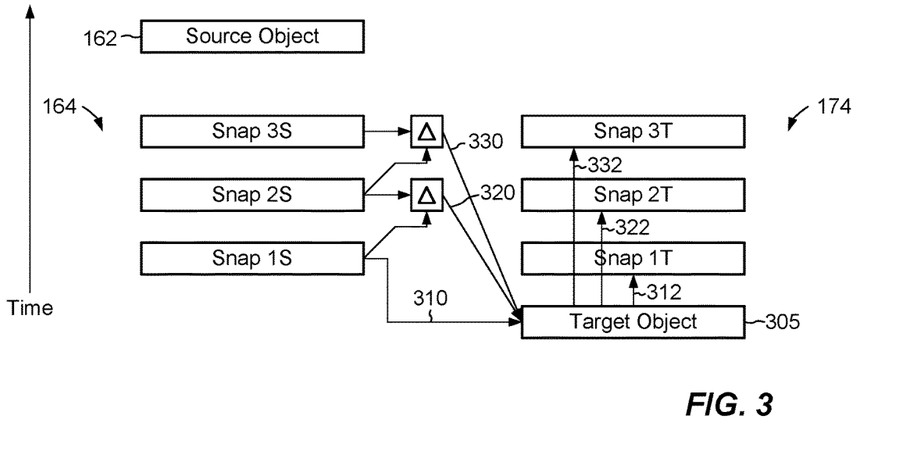
FIG. 3 is a block diagram showing example snapshot-shipping operations for migrating source snaps of the source data object to target snaps.

FIG. 3 shows an example arrangement for migrating snaps of the data object from source to target. In an example, migration of snaps is performed by the snapshot-shipping transport 142 under direction of the mobility manager 140. As described in connection with FIG. 1, snap migration may be done before or after migration of the data object in file 162, e.g., depending on the option specified in the migration request 136.

In an example, snap migration proceeds in order from oldest snap to newest. Although three snaps are shown, this number is chosen merely for illustration, as there may be any number of snaps of the data object at the source.

Snap migration may begin with the snapshot-shipping transport 142 performing operation 310 to copy a first source snap (Snap 1S) from file system 160 to an initial version 305 of the target object. This may be a full copy of the Snap 1S, for example. Once the copy of Snap 1S is complete, the snapshot-shipping transport 142 takes a new snap (arrow 312) of the target object 305 to create Snap 1T at the target. For example, Snap 1T is a redirect-on-write snap of the target object 305 in file system 170 (FIG. 1).

Next, the snapshot-shipping transport 142 computes a difference 320 between the next-oldest snap, Snap 2S, and Snap 1S. In an example, the difference 320 is expressed as a list of locations (e.g., block locations) and corresponding data at the respective locations. The snapshot-shipping transport 142 ships the difference 320 to the target and applies the difference 320 to the target object 305. In an example, applying the difference 320 includes writing the data specified on the list at the respective locations of the target object 305. Once the difference 320 is applied, the content of the target object 305 matches the content of Snap 2S, and the snapshot-shipping transport 142 takes another snap (arrow 322) of the target object 305 to create Snap 2T, which is equivalent to Snap 2S.

Continuing, the snapshot-shipping transport 142 computes a difference 330 between Snap 3S, the next-oldest snap, and Snap 2S. The snapshot-shipping transport 142 then ships the difference 330 to the target and applies the difference 330 to the target object 305. Once the difference 330 is applied, the content of the target object 305 matches the content of Snap 3S, and the snapshot-shipping transport 142 takes another snap (arrow 332) of the target object 305 to create Snap 3T. Snap 3T is equivalent to Snap 3S.

Operation may continue in this fashion for any additional source snaps if such source snaps are present. At the conclusion of snap migration, all snaps 164 of the source object are reconstituted in snaps 174 at the target. If the above-described snap migration is performed after migration of the data object in file 162 (i.e., using the "fast" option above), then migration of the both the data object and its snaps is complete.

Figure 4:
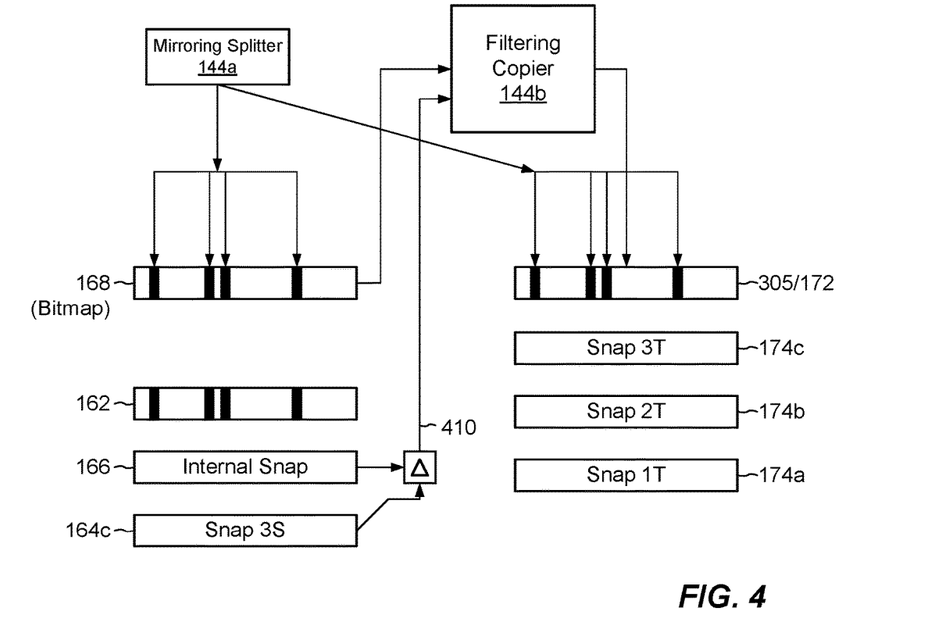
FIG. 4 is a block diagram showing a variant of the operations of FIG. 2, which may be practiced when migration of source snaps is performed prior to migration of the source data object.

FIG. 4 shows an example variant of aspects of the arrangement of FIG. 2, which may be performed in connection with the "efficient" option above, i.e., when snap migration is conducted before migration of the object in file 162. In this scenario, the file 172 (172) is provided by the target object 305 (FIG. 3).

For example, at the conclusion of snap migration (FIG. 3), the target object 305 contains the most recent version of the data object as of the most recent snap (i.e., Snaps 3S and 3T). But the internal snap 166, taken when object migration begins, provides a still more recent version of the file 162. In this situation, when Snap 3T is already present at the target, it is not necessary to perform a filtering copy of the entire contents of the internal snap 166. Rather, the filtering copier 144b need only operate on the differences between the internal snap 166 and Snap 3S. Accordingly, in this scenario, a difference 410 is computed between the internal snap 166 and Snap 3S. The difference 410 may be provided in the same form as the differences 320 and 330 described above in connection with FIG. 3. The filtering copier 144b receives the difference 410 and the bitmap 168 and copies to the target only the data from locations that are not marked on the bitmap 168. It should be appreciated that the amount of data in the difference 410 is typically a small subset of all the data of the internal snap 166, making the filtering copy operation efficient in this scenario.

Figure 5:
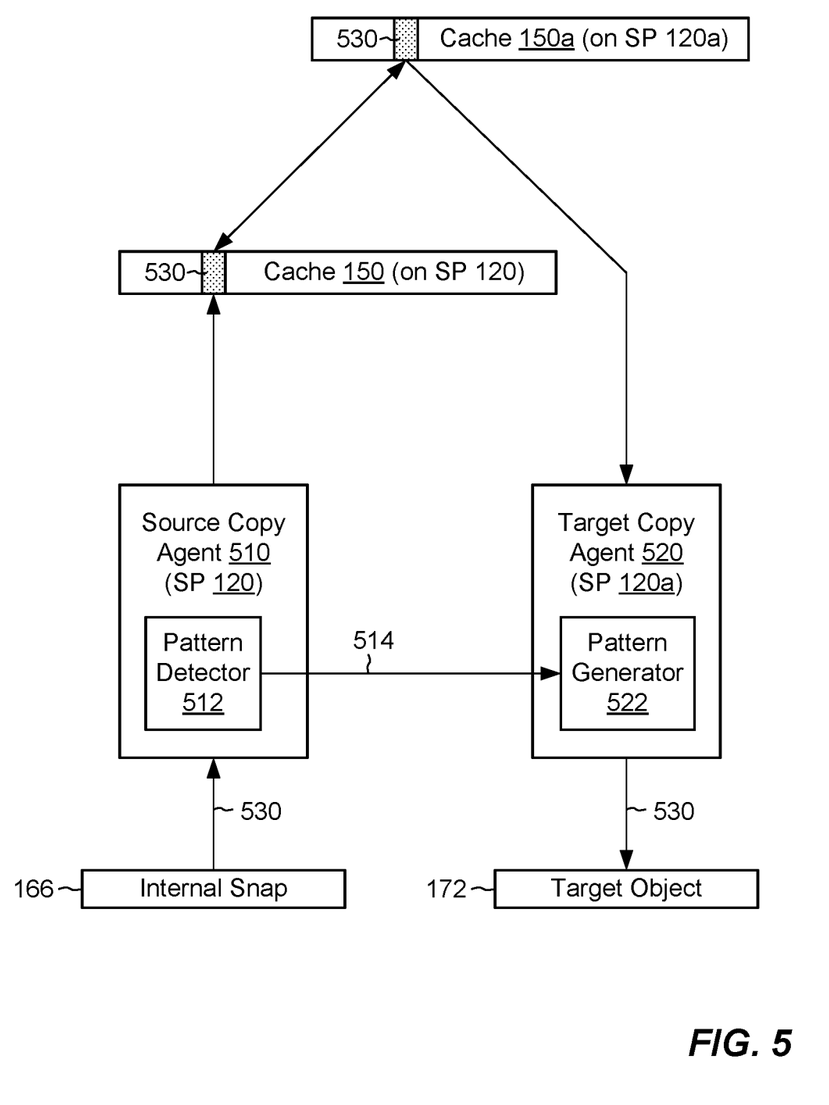
FIG. 5 is a block diagram showing example features that may be used when copying data from source to target.

FIG. 5 shows example features that may be used when copying data from source to target, e.g., during the filtering copy operation and/or when copying or shipping snaps (or snap differences) from source to target. In the example shown, a source copy agent 510 runs on SP 120 and performs a copy of data 530 from the internal snap 166 to local cache 150 (i.e., cache on SP 120). As described above, the cache 150 may be mirrored between SP 120 and SP 120a. Thus, the act of initiating the copy has the effect of storing the data 530 both in the cache 150 on SP 120 and in a cache 150a on SP 120a. To complete the copy, a cache page in cache 150a storing the data 530 is tagged with a target location, i.e., a destination in the target object 172 where the data 530 is directed. Under direction of a target copy agent 520, for example, the cache 150a is flushed and the data 530 are sent to the tagged location. In an example, the above-describe caching and flushing operations may be performed using a DM-IOCTL instruction. Although this example pertains to a copy between SPs, it should be understood that that same operation may be performed within a single SP (e.g., internally to SP 120 or SP 120a), without the aid of data mirroring.

As further shown in FIG. 5, the source copy agent 510 includes a pattern detector 512 and the target copy agent 520 includes a pattern generator 522. In an example, both agents 510 and 520 include both the pattern detector 512 and the pattern generator 522, i.e., the arrangement is symmetrical. The pattern detector 512 is configured to detect one or more predetermined patterns in data 530, such as all-zeroes, all-ones, and/or other patterns. When the pattern detector 512 detects a predetermined pattern, the pattern detector 512 obtains a code 514 that represents the detected pattern and distinguishes it from other patterns. Rather than copying the data 530, the source copy agent merely sends the code 514 to the target copy agent 520. The target copy agent 520 reads the code 514, identifies the predetermined pattern from the code 514, and generates the predetermined pattern represented by the code 514 at the target. Significant amounts of data copying can thus be avoided.

Figure 6:
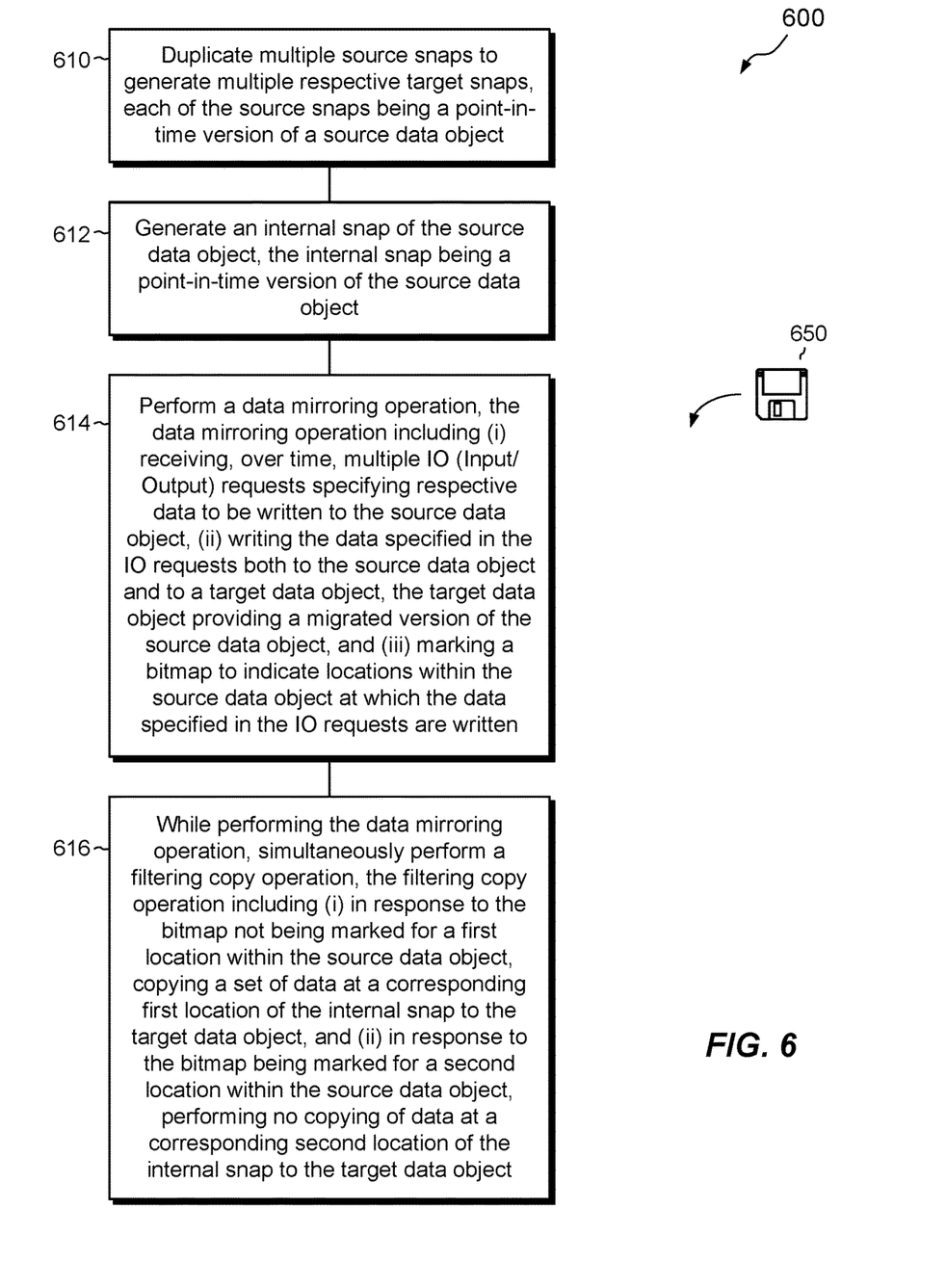
FIG. 6 is a flowchart showing an example data migration process that may be conducted in the example environment of FIG. 1.

FIG. 6 shows a process 600 that may be carried out in connection with the data storage system 116. The process 600 is typically performed by the software constructs, described in connection with FIGS. 1 and 2, which reside in the memory 130 of the storage processor(s) 120 and/or 120a, and are run by the set of processing units 124. The various acts of the process 600 may be ordered in any suitable way. Accordingly, embodiments may be constructed in which acts are performed in orders different from those illustrated, which may include performing some acts simultaneously, even though the acts are shown as sequential in the illustrated embodiments.

At 610, multiple source snaps are duplicated to generate multiple respective target snaps. Each of the source snaps is a point-in-time version of a source data object. For example, the snapshot-shipping transport 142 performs snap migration, such as that shown in FIG. 3, on multiple source snaps 164 to generate multiple respective target snaps 174. Each source snap 164 is a point-in-time version of the source data object realized in file 162. Snap migration may be performed before or after migration of the source data object realized in the file 162, e.g., based on administrator preference.

At 612, an internal snap is generated of the source data object. The internal snap is a point-in-time version of the source data object. For example, internal snap 166 is generated as a snap of file 162, which realizes the data object at the source. The internal snap is a point-in-time version of the data object in file 162 and reflects the state of that object as of the moment the internal snap 166 is created.

At 614, a data mirroring operation is performed. The data mirroring operation includes (i) receiving, over time, multiple IO (Input/Output) requests specifying respective data to be written to the source data object, (ii) writing the data specified in the IO requests both to the source data object and to a target data object, the target data object providing a migrated version of the source data object, and (iii) marking a bitmap to indicate locations within the source data object at which the data specified in the IO requests are written. For example, the mirroring splitter 144a (FIG. 2) receives a set of IO requests 112 specifying respective data (e.g., 112a, 112b, 112c, and 112d) to be written to respective designated locations (e.g., 162a, 162b, 162c, and 162d) of the data object in file 162. The mirroring splitter 144a writes the specified data both to the source object in file 162 and to the target object in file 172, marking the bitmap 168 for each written location.

At 616, while performing the data mirroring operation, a filtering copy operation is simultaneously performed. The filtering copy operation includes (i) in response to the bitmap not being marked for a first location within the source data object, copying a set of data at a corresponding first location of the internal snap to the target data object, and (ii) in response to the bitmap being marked for a second location within the source data object, performing no copying of data at a corresponding second location of the internal snap to the target data object. For example, the filtering copier 144b (FIG. 2) copies data from locations of the internal snap 166 to corresponding locations in the target object in file 172, but only for locations that are not marked in the bitmap 168 (e.g., location 162e of FIG. 2). Marked locations (e.g., location 162c) are not copied, as the target object in file 172 has already received more recent data. The scope of data of the internal snap 166 subject to copying may be the entire internal snap 166, if snap migration has not yet occurred, or may be differences relative to a most recent one of the snaps 164, if snap migration has already occurred.

Having described certain embodiments, numerous alternative embodiments or variations can be made. For example, the source data object and the target data object have been shown as files 162 and 172 in respective file systems 160 and 170; however, this is merely an example. Alternatively, the source and target data objects may be provided in other forms, besides files, such as volumes, file systems, logical disks, physical disks, and combinations of any of the foregoing, for example.

Also, the bitmap 168 has been shown and described as having a separate bit for each location of the internal snap 166. However, this is merely an example. Alternatively, the bitmap 168 may be implemented in other ways, such as using a list of locations that have been written to. Thus, the bitmap 168 may be provided in any form that identifies written-to locations in response to IO requests.

Also, embodiments have been shown and described in connection with a data storage system 116, which may include specialized hardware and software optimized for storing and moving data. Alternatively, however, embodiments may be provided using other types of hardware, including general purpose hardware. Some embodiments may be provided in virtual machines, and/or by using so-called software-defined storage (SDS).

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of performing data migration, the method comprising:
    duplicating multiple source snaps to generate multiple respective target snaps, each of the source snaps being a point-in-time version of a source data object;
    generating an internal snap of the source data object, the internal snap being a point-in-time version of the source data object;
    performing a data mirroring operation, the data mirroring operation including (i) receiving, over time, multiple IO (Input/Output) requests specifying respective data to be written to the source data object, (ii) writing the data specified in the IO requests both to the source data object and to a target data object, the target data object providing a migrated version of the source data object, and (iii) marking a bitmap to indicate locations within the source data object at which the data specified in the IO requests are written; and
    while performing the data mirroring operation, simultaneously performing a filtering copy operation, the filtering copy operation including (i) in response to the bitmap not being marked for a first location within the source data object, copying a set of data at a corresponding first location of the internal snap to the target data object, and (ii) in response to the bitmap being marked for a second location within the source data object, performing no copying of data at a corresponding second location of the internal snap to the target data object,
    wherein the method further comprises:
        prior to generating the internal snap, pausing a processing of IO requests directed to the source data object;
        while the processing of IO requests is paused, initializing the bitmap to reflect no marked locations within the source data object; and
        after generating the internal snap and initializing the bitmap, resuming the processing of IO requests directed to the source data object.

2. The method of claim 1, wherein migration of the source data object and its snaps is performed under direction of a mobility manager and in response to a migration request, the mobility manager coordinating activities of a snapshot-shipping transport, for duplicating the multiple source snaps, and a migration driver, for performing the data mirroring operation and the filtering copy operation.

3. The method of claim 2, wherein, when performing the filtering copy operation, copying the set of data to the target data object includes:
- identifying, by a source copying agent, a predetermined pattern in the set of data;
- sending a code from the source copying agent to a target copying agent, the code representing the predetermined pattern and distinguishing from other patterns;
- generating, by the target copy agent, the predetermined pattern represented by the code; and
- storing the generated predetermined pattern as the set of data in the target object.

4. The method of claim 2, wherein the source data object and the target data object are both stored within a single data storage system, wherein the data storage system has a cache, and wherein, when performing the filtering copy operation, copying the set of data to the target data object includes:
- reading the set of data into the cache; and
- writing the set of data from cache to the target data object.

5. The method of claim 4, wherein the cache is mirrored between a first storage processor and a second storage processor of the data storage system, wherein reading the set of data into the cache is performed by the first storage processor, and wherein writing the set of data from cache into the target data object is performed by the second storage processor.

6. The method of claim 1, wherein duplicating the multiple source snaps is performed with snapshot-shipping operations, the snapshot shipping operations including:
- copying a first source snap to generate a target object, the first snap being an earliest point-in-time version of the source data object from among the multiple source snaps;
- generating a first target snap of the target object; and
- for each additional source snap going in order from earliest to most recent, computing a difference relative to an immediately previous source snap, applying the difference to the target object, and snapping the target object to create a respective target snap.

7. The method of claim 6, wherein duplicating the multiple source snaps is performed after generating the internal snap.

8. The method of claim 6, wherein duplicating the multiple source snaps is performed prior to generating the internal snap.

9. The method of claim 8, further comprising computing a last difference between the internal snap and a most recent source snap, the last difference identifying data of the internal snap that differ from data of the most recent source snap and locations where those differences occur, wherein, when performing the filtering copy operation, only locations indicated by the last difference are candidates for copying to the target data object based on whether the bitmap is marked.

10. A data storage system, comprising control circuitry that includes a set of processing units coupled to memory, the control circuitry constructed and arranged to:
- duplicate multiple source snaps to generate multiple respective target snaps, each of the source snaps being a point-in-time version of a source data object;
- generate an internal snap of the source data object, the internal snap being a point-in-time version of the source data object;
- perform a data mirroring operation, the data mirroring operation including (i) receiving, over time, multiple IO (Input/Output) requests specifying respective data to be written to the source data object, (ii) writing the data specified in the IO requests both to the source data object and to a target data object, the target data object providing a migrated version of the source data object, and (iii) marking a bitmap to indicate locations within the source data object at which the data specified in the IO requests are written; and
- while performing the data mirroring operation, simultaneously perform a filtering copy operation, the filtering copy operation including (i) in response to the bitmap not being marked for a first location within the source data object, copying a set of data at a corresponding first location of the internal snap to the target data object, and (ii) in response to the bitmap being marked for a second location within the source data object, performing no copying of data at a corresponding second location of the internal snap to the target data object,
wherein the control circuitry constructed and arranged to duplicate the multiple source snaps is further constructed and arranged to:
- copy a first source snap to generate a target object, the first snap being an earnest point-in-time version of the source data object from among the multiple source snaps;
- generate a first target snap of the target object; and
- for each additional source snap going in order from earliest to most recent, compute a difference relative to an immediately previous source snap, apply the difference to the target object, and snap the target object to create a respective target snap.

11. A computer program product including a set of non-transitory, computer-readable media having instructions which, when executed by control circuitry of a data storage system, cause the control circuitry to perform a data migration method, the method comprising:
- duplicating multiple source snaps to generate multiple respective target snaps, each of the source snaps being a point-in-time version of a source data object;
- generating an internal snap of the source data object, the internal snap being a point-in-time version of the source data object;
- performing a data mirroring operation, the data mirroring operation including (i) receiving, over time, multiple IO (Input/Output) requests specifying respective data to be written to the source data object, (ii) writing the data specified in the IO requests both to the source data object and to a target data object, the target data object providing a migrated version of the source data object, and (iii) marking a bitmap to indicate locations within the source data object at which the data specified in the IO requests are written; and
- while performing the data mirroring operation, simultaneously performing a filtering copy operation, the filtering copy operation including (i) in response to the bitmap not being marked for a first location within the source data object, copying a set of data at a corresponding first location of the internal snap to the target data object, and (ii) in response to the bitmap being marked for a second location within the source data object, performing no copying of data at a corresponding second location of the internal snap to the target data object,
wherein, when performing the filtering copy operation, copying the set of data to the target data object includes:
- identifying, by a source copying agent, a predetermined pattern in the set of data;

sending a code from the source copying agent to a target copying agent, the code representing the predetermined pattern and distinguishing from other patterns;

generating, by the target copy agent, the predetermined pattern represented by the code; and storing the generated predetermined pattern as the set of data in the target object.

12. The computer program product of claim 11, wherein migration of the source data object and its snaps is performed under direction of a mobility manager and in response to a migration request, the mobility manager coordinating activities of a snapshot-shipping transport, for duplicating the multiple source snaps, and a migration driver, for performing the data mirroring operation and the filtering copy operation.

13. The computer program product of claim 12, wherein duplicating the multiple source snaps by the snapshot-shipping transport includes:

copying a first source snap to generate a target object, the first snap being an earliest point-in-time version of the source data object from among the multiple source snaps;

generating a first target snap of the target object; and for each additional source snap going in order from earliest to most recent, computing a difference relative to an immediately previous source snap, applying the difference to the target object, and snapping the target object to create a respective target snap.

14. The computer program product of claim 13, wherein the migration request received by the mobility manager specifies an option for invoking the snapshot-shipping transport before invoking the migration driver, and wherein the mobility manager, in response to the option in the migration request, invokes the snap-shot shipping transport for duplicating the multiple source snaps prior to directing generation of the internal snap.

15. The computer program product of claim 14, further comprising computing a last difference between the internal snap and a most recent source snap, the last difference identifying data of the internal snap that differ from data of the most recent source snap and locations where those differences occur, wherein, when performing the filtering copy operation, only locations indicated by the last difference are candidates for copying to the target data object based on whether the bitmap is marked.

16. The computer program product of claim 13, wherein the migration request received by the mobility manager specifies an option for invoking the snapshot-shipping transport after invoking the migration driver, and wherein the mobility manager, in response to the option in the migration request, directs duplicating the multiple source snaps after directing generation of the internal snap.

17. The computer program product of claim 12, wherein the source data object and the target data object are both stored within a single data storage system, wherein the data storage system has a cache, and wherein, when performing the filtering copy operation, copying the set of data to the target data object includes:

reading the set of data into the cache; and writing the set of data from cache to the target data object.

18. The computer program product of claim 17, wherein the cache is mirrored between a first storage processor and a second storage processor of the data storage system, wherein reading the set of data into the cache is performed by the first storage processor, and wherein writing the set of data from cache into the target data object is performed by the second storage processor.

\* \* \* \* \*